(12) United States Patent
Oderberg et al.

(10) Patent No.: US 12,511,455 B2
(45) Date of Patent: Dec. 30, 2025

(54) PURPOSEFUL STRESS TESTING OF AUTONOMOUS VEHICLE RESPONSE TIME WITH SIMULATION

(71) Applicant: GM CRUISE HOLDINGS LLC, San Francisco, CA (US)

(72) Inventors: Sidney Oderberg, San Francisco, CA (US); Christopher Kniffin, San Diego, CA (US); Robert Tsai, San Francisco, CA (US); Samuel J. Abrahams, Falls Church, VA (US); Sagar Tatipamula, Mountain View, CA (US); Pradeep Bhatta, Princeton, NJ (US); Zhe Zhang, Fremont, CA (US); Tommaso Colombo, San Mateo, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 143 days.

(21) Appl. No.: 18/456,879

(22) Filed: Aug. 28, 2023

(65) Prior Publication Data
US 2025/0077731 A1    Mar. 6, 2025

(51) Int. Cl.
*G06F 30/20* (2020.01)
*B60W 50/04* (2006.01)
*B60W 60/00* (2020.01)

(52) U.S. Cl.
CPC ......... *G06F 30/20* (2020.01); *B60W 60/0027* (2020.02); *B60W 50/045* (2013.01); *B60W 2556/40* (2020.02)

(58) Field of Classification Search
CPC . G06F 30/20; B60W 60/001; B60W 60/0027; B60W 50/045; B60W 2556/40
See application file for complete search history.

(56) References Cited

U.S. PATENT DOCUMENTS 10,852,721 B1 * 12/2020 Smith ................. G06F 11/3684
11,964,670 B1 *  4/2024 Van Alsenoy ..... G01C 21/3837
(Continued)

OTHER PUBLICATIONS

Drechsler et al.; MiRE, A Mixed Reality Environment for Testing of Automated Driving Functions; IEEE Transactions on Vehicular Technology, vol. 71, No. 4, Apr. 2022; pp. 3443-3456 (Year: 2022).*
(Continued)

*Primary Examiner* — Michael J Zanelli
(74) *Attorney, Agent, or Firm* — CANTOR COLBURN LLP

(57) ABSTRACT

Disclosed are embodiments for facilitating purposeful stress testing of autonomous vehicle response time with simulation. In some aspects, an embodiment includes receiving a request to launch a simulation scenario on an autonomous vehicle (AV) that is to operate on a real-world test course; initiating a simulation derived from the simulation scenario using a simulation driver that is executing on the AV; engaging operation of the AV on the real-world test course; coordinating a simulated AV position in the simulation with a physical AV position of the AV on the real-world test course; combining virtual entities from the simulation with physical entities on the real-world test course into a list of tracked objects for the AV; and causing the AV to respond to the list of tracked objects including the virtual entities and the physical entities during the operation of the AV on the real-world test course.

9 Claims, 6 Drawing Sheets

(56) References Cited

U.S. PATENT DOCUMENTS

| | | | | |
|---|---|---|---|---|
| 2019/0130056 A1* | 5/2019 | Tascione | ............... | G06F 30/20 |
| 2020/0250067 A1* | 8/2020 | Walther | ............... | G06F 30/20 |
| 2021/0166474 A1* | 6/2021 | Behar | ............... | G06T 19/20 |
| 2022/0242450 A1* | 8/2022 | Sokolov | ............ | G06Q 10/0635 |
| 2022/0289217 A1* | 9/2022 | Guvenc | ............... | B60W 50/04 |
| 2022/0366638 A1* | 11/2022 | Lasram | ............... | G06T 7/251 |
| 2023/0039658 A1* | 2/2023 | Ariyaratne | ....... | B60W 30/0956 |
| 2023/0192104 A1 | 6/2023 | Grace et al. | | |

OTHER PUBLICATIONS

Chen et al.; Mixed Test Environment-based Vehicle-in-the-loop Validation—A New Testing Approach for Autonomous Vehicles; 2020 IEEE Intelligent Vehicles Symposium (IV) Oct. 20-23, 2020. Las Vegas, USA; pp. 1283-1289 (Year: 2020).*

Deter et al.; Simulating the Autonomous Future; IEEE Signal Processing Magazine; Jan. 2021; Digital Object Identifier 10.1109/MSP.2020.2984428; pp. 111-121 (Year: 2021).*

Berntorp et al.; Control Architecture Design for Autonomous Vehicles; 2018 IEEE Conference on Control Technology and Applications (CCTA) Copenhagen, Denmark, Aug. 21-24, 2018; pp. 404-411 (Year: 2018).*

* cited by examiner

300

```
┌─────────────────────────────────────────────────────────────────────┐
│ Receive a request to launch a simulation scenario on an autonomous  │
│ vehicle (AV) that is to operate on a real-world test course         │
│                                                                 310 │
└─────────────────────────────────────────────────────────────────────┘
                                    ↓
┌─────────────────────────────────────────────────────────────────────┐
│ Initiate a simulation derived from the simulation scenario using a  │
│ simulation driver executing on the AV                               │
│                                                                 320 │
└─────────────────────────────────────────────────────────────────────┘
                                    ↓
┌─────────────────────────────────────────────────────────────────────┐
│ Engage operation of the AV on the real-world test course            │
│                                                                 330 │
└─────────────────────────────────────────────────────────────────────┘
                                    ↓
┌─────────────────────────────────────────────────────────────────────┐
│ Coordinate, during the operation of the AV, a simulated AV position │
│ in the simulation with a physical position of the AV on the         │
│ real-world test course                                              │
│                                                                 340 │
└─────────────────────────────────────────────────────────────────────┘
                                    ↓
┌─────────────────────────────────────────────────────────────────────┐
│ Combine virtual entities from the simulation with physical entities │
│ on the real-world test course into a list of tracked objects for    │
│ the AV                                                              │
│                                                                 350 │
└─────────────────────────────────────────────────────────────────────┘
                                    ↓
┌─────────────────────────────────────────────────────────────────────┐
│ Cause the AV to respond to the list of tracked objects including    │
│ the virtual entities and the physical entities during the operation │
│ of the AV on the real-world test course                             │
│                                                                 360 │
└─────────────────────────────────────────────────────────────────────┘
```

┌─────────────────────────────────────────────────────────────────────────┐
│ Initiate a simulation derived from a simulation scenario file using a simulation driver │
│ executing on the AV │
│ 410 │
└─────────────────────────────────────────────────────────────────────────┘
                                        ↓
┌─────────────────────────────────────────────────────────────────────────┐
│ Engage operation of the AV on a real-world test course having physical entities, the │
│ operation of the AV to be engaged at a physical starting point that is the same as a virtual │
│ starting point in the simulation │
│ 420 │
└─────────────────────────────────────────────────────────────────────────┘
                                        ↓
┌─────────────────────────────────────────────────────────────────────────┐
│ During the operation of the AV, coordinate a simulated AV position in the simulation with a │
│ physical position of the AV on the real-world test course │
│ 430 │
└─────────────────────────────────────────────────────────────────────────┘
                                        ↓
┌─────────────────────────────────────────────────────────────────────────┐
│ Responsive to the simulated AV position enters a simulation zone of the simulation, │
│ monitor for occurrence of at least one defined events corresponding to the simulation zone │
│ 440 │
└─────────────────────────────────────────────────────────────────────────┘
                                        ↓
┌─────────────────────────────────────────────────────────────────────────┐
│ Responsive to occurrence of the at least one defined event in the simulation zone, identify │
│ a virtual entity corresponding to the at least one defined event and the simulation zone │
│ 450 │
└─────────────────────────────────────────────────────────────────────────┘
                                        ↓
┌─────────────────────────────────────────────────────────────────────────┐
│ Cause the virtual entity to be injected into a list of tracked objects maintained by an AV │
│ stack executing on the AV, where the list of tracked objects comprises the physical entities │
│ and the virtual entities, and where the AV is to physically respond to the list of tracked │
│ objects during the operation on the real-world test course │
│ 460 │
└─────────────────────────────────────────────────────────────────────────┘

FIG. 4

PURPOSEFUL STRESS TESTING OF AUTONOMOUS VEHICLE RESPONSE TIME WITH SIMULATION

BACKGROUND

1. Technical Field

The disclosure generally relates to the field of processing systems and, more specifically, to purposeful stress testing of autonomous vehicle response time with simulation.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 3 illustrates an example method for implementing purposeful stress testing of AV response time with simulation, in accordance with embodiments herein;

FIG. 4 illustrates an example method for implementing purposeful stress testing of autonomous vehicle response time with simulation using simulation zones, in accordance with embodiments herein;

DETAILED DESCRIPTION

Figure 1:
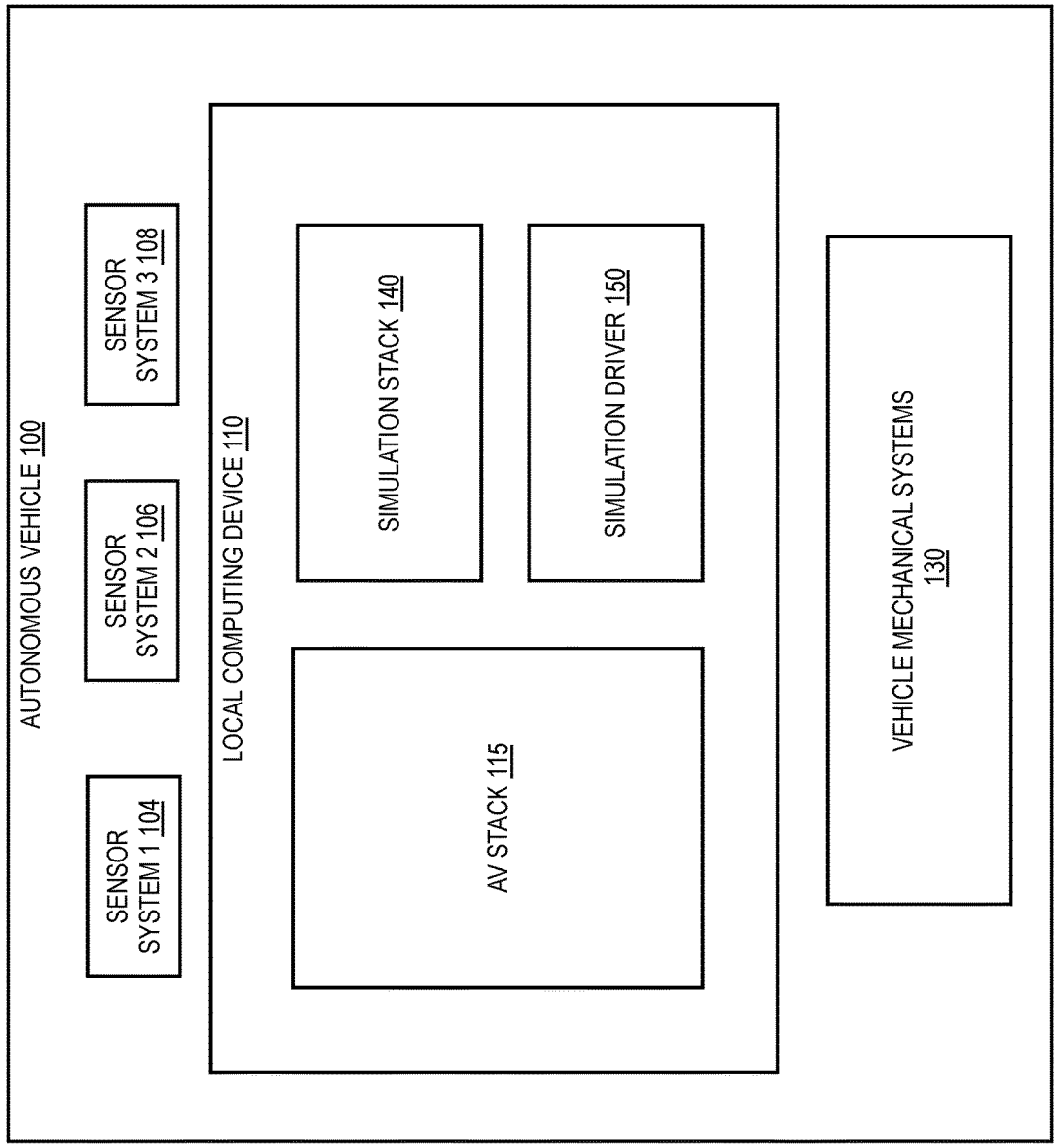
FIG. 1 is a block diagram of a detailed view of an example autonomous vehicle (AV) providing purposeful stress testing of AV response time with simulation, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the disclosure is the gathering and use of data available from various sources to improve quality and experience. The disclosure contemplates that in some instances, this gathered data may include personal information. The disclosure contemplates that the entities involved with such personal information respect and value privacy policies and practices.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

During operation, the AV may depend on geographic and spatial (geospatial) data to localize itself (e.g., obtain its position and orientation (pose)) and other objects within its immediate surroundings, determine routes towards destinations, and to coordinate motor controls to maneuver safely and efficiently while in transit, among other operations. The AV geospatial data can include the various dimensions or attributes (e.g., Global Positioning System (GPS) coordinates; polygon vertices; polyline vertices; length, width, height; radial distance, polar angle; etc.) of physical places and things (e.g., streets, lanes, crosswalks, sidewalks, medians, traffic signal poles, traffic signs, etc.). The AV geospatial data can also include abstract or semantic features (e.g., speed limits, carpool lanes, bike lanes, crosswalks, intersections, legal or illegal U-turns, traffic signal lights, etc.) that the AV can evaluate to determine the next set of actions it may take for a given situation. In order to prepare an AV for navigating autonomously, a machine learning model may use information about one or more environments surrounding any number of AVs as input. Such input may allow the machine learning model to be trained to recognize, assess, and/or react to such environments. In order to improve AV response to environments, AVs are often tested.

Closed course testing is one avenue for testing AV capabilities before new software is released for the AV (e.g., for a commercial fleet including the AV). As part of the closed course testing, "scenarios" are set up for the AV to handle. This can involve placing parked cars or static objects on the closed course and, in some cases, involves using dummies that move on tracks. These dummies may start hidden behind a car and as the AV approaches, a dummy is pulled across the track to emulate a person walking out in front of the AV from a blind spot.

When testing the AV on the road or a closed course, it may be difficult to create complex scenarios to test detailed responses of different AV subsystems. Specifically, on-road scenes may involve a multitude of different active traffic participants (e.g., pedestrians, bicycles, cars, motorcycles, buses, etc.) and environmental factors (e.g., different lane sizes, signs, obstructions, vegetation, etc.). It is challenging to accurately recreate such scenarios in a closed course testing, as it is difficult to manage multiple agents and have resources available to match the details of the various scenarios that AVs may encounter on the road. A detailed re-creation would utilize, for example, drawing different lane markers to represent different intersections, getting multiple pedestrians (or pedestrian-like agents) to move in specific directions at specific times, etc.

Furthermore, setting up these scenarios is a time-consuming process and dummies are a consumable resource that must be periodically replaced. In addition, some testing of AV reactions is being set up for high driving speeds and/or on low friction surfaces. Some closed courses may have ceramic or basalt tiles that the AV can drive on to test how maneuvers and braking systems perform in different friction conditions. However, a dummy system may not have been designed to work with these tile surfaces.

As such, testing complex AV systems can be particularly challenging due to the complexities of the various scenarios AVs encounter as noted above. In many cases, these scenarios are difficult to reproduce in closed-course testing due to the diversity of agents and environments that may be utilized. As an alternative, testing of complex AV scenarios may be done using computer-implemented simulated scenarios (e.g., a scenario represented within a simulated computer environment). However, purely simulated scenarios may lack the detailed physics present in the real world. Additionally, AV testing is often not practical to conduct on actual roads with real traffic participants. Accordingly, there is value in testing AVs in physical reality such as a closed course environment.

In a closed course environment, the physics of the real world (e.g., vehicle dynamics, road imperfections, etc.), real sensor data (e.g., reflectivity of objects, etc.), and realistic AV hardware effects (e.g., latency, etc.) may be incorporated. As an example, there are times where the friction coefficient between a tire and the road, slight variations in latency (e.g., caused by hardware), the noisiness of sensor readings, etc., can be the difference between a safety critical situation and just a normal situation. For this reason, closed course testing can be quite useful in determining the quality and/or safety of an AV. However, as noted above, performing closed course testing may utilize a significant amount of resources, manual labor, time, etc. For example, real cars have to be positioned in certain places, faux pedestrian motion should be driven by someone during the test, etc. This limits the amount of closed-course testing that can be done as it is expensive, labor intensive, and time consuming.

In order to improve the testing of complex AV systems in closed course environments, embodiments herein provide purposeful stress testing of AV response time with simulation. The purposeful stress testing of AV response time with simulation of embodiments can include combining an AV stack and a simulation stack running at the same time in the same AV. The AV may be operating on a closed course in order to test the AV's reaction to both real and virtual obstacles on the closed course. For example, during a run-through of the testing framework of embodiments herein, an AV can operate on a real-world closed course. At the same time, the modified stack of the AV, including the AV stack and the simulation stack, can execute a simulation that takes place in the same location as the real-world closed course. The real-world AV and the simulation AV are coordinated to be in the same location because the AV stack controls both AVs, (the real-world AV and the simulation AV).

In some embodiments, the simulation scenario can be configured to include simulation zones on the map. When the simulation AV enters one of the simulation zones, the simulation stack (executing on the AV) can inject (e.g., spawn, create, etc.) virtual entities (e.g., cars, pedestrians, etc.). These virtual entities are injected into the AV stack, which causes the real-world AV to react to the virtual entities. The AV may react as if it is seeing these virtual entities in the real world, which enables embodiments herein to induce the same reaction that the AV would have for the dummies, for example. The real-world testing of the AV with concurrent simulation described herein can also be utilized to observe how the AV performs in various complex scenarios, such as at different speeds and/or on surfaces with varying levels of friction.

The following description discussed embodiments as implemented in an automotive environment, but one skilled in the art will appreciate that embodiments may be implemented in a variety of different environments and use cases. Further details of the purposeful stress testing of AV response time with simulation of embodiments herein are further described below with respect to FIGS. 1-6.

FIG. 1 is a block diagram of a detailed view of an example AV 100 providing purposeful stress testing of AV response time with simulation, in accordance with embodiments herein. Although some embodiments herein are described as operating in an AV 100, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment.

In one embodiment, AV 100 can navigate about roadways without a human driver based on sensor signals generated by multiple sensor systems 104, 106, and 108. The sensor systems 104-108 can include different types of sensors and can be arranged about the AV 100. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 100 can also include several mechanical systems 130 that can be used to maneuver or operate AV 100. For instance, the mechanical systems 130 can include vehicle propulsion system, braking system, steering system, safety system, and cabin system, among other systems. The mechanical systems 130 are described in further detail below with respect to FIG. 5.

AV 100 can additionally include a local computing device 110 that is in communication with the sensor systems 104-108, and the mechanical systems 130-138. In some embodiments, the local computing device 110 may also be in communication with a data center (not shown) and one or more other client computing devices (not shown), among other systems. The local computing device 110 can include one or more processors and memory, including instructions that can be executed by the one or more processors. The instructions can make up one or more software stacks or components responsible for controlling the AV 100; communicating with the data center, the client computing device (s), and other systems; receiving inputs from riders, passengers, and other entities within the AV's environment; logging metrics collected by the sensor systems 104-108; and so forth.

In this example, the local computing device 110 may also include an AV stack 115. The AV stack 115 can include components and processes to enable and support decision making in the AV operations in terms of routing, planning, sensing, maneuvering, operating, and so on. The AV stack 115 can include, among other stacks and systems, a perception stack, a mapping and localization stack, a planning stack, a control stack, a communications stack, a High Definition (HD) geospatial database, and an AV operational database, for example. Further details of the components of AV stack 115 may be found, for example, in the discussion of FIG. 5.

As previously discussed, in order to improve the testing of complex AV systems in closed course environments, embodiments herein provide purposeful stress testing of AV response time with simulation. In one embodiment, AV 100 is modified to include at least a portion of a simulation stack 140 operating in concurrence with the AV stack 115. The simulation stack 140 enables execution of a simulation driver 150 on the AV to initiate a simulation environment on the AV and allows for the fusion of simulated environment elements with real-world elements in the AV stack 115. In other words, this modified stack configuration including the AV stack 115 operating in conjunction with the simulation stack 140 provides a singular real/simulation AV that enables precise location-based injection (or removal) of virtual entities (e.g., virtual obstacles) for the AV to react to while operating on the real-world closed course environment.

For example, in the testing framework of embodiments herein, an AV can operate on a real-world closed course. The modified stack of AV, including the AV stack 115 and the simulation stack 140, can execute a simulation, via simulation driver 150, that takes place in the same location as the real-world, such as on a real-world closed course environment. Accordingly, the positions of the real-world AV and the simulation AV are coordinated to be in the same location because the AV stack 115 ultimately controls both AVs, the real-world AV and the simulation AV.

In some embodiments, the simulation scenario can be configured to include simulation zones on the map. When the simulation AV enters one of the simulation zones, the simulation stack (executing on the AV) can inject (e.g., spawn, create, etc.) virtual entities (e.g., cars, pedestrians, other objects, road conditions, weather, etc.). These virtual entities are injected into the AV stack, which causes the real-world AV to react to the virtual entities. The AV may react as if it is seeing these virtual entities in the real world, which enables embodiments herein to induce the same reaction that the AV would have for the dummies, for example. The real-world testing of the AV with concurrent simulation described herein can also be utilized to observe how the AV performs at various complex scenarios, such as at different speeds and/or on surfaces with varying levels of friction. Further details of operation of the purposeful stress testing of AV response time with simulation using the modified AV stack 115 and simulation stack 140 are described with respect to FIGS. 2-6 below.

Figure 2:
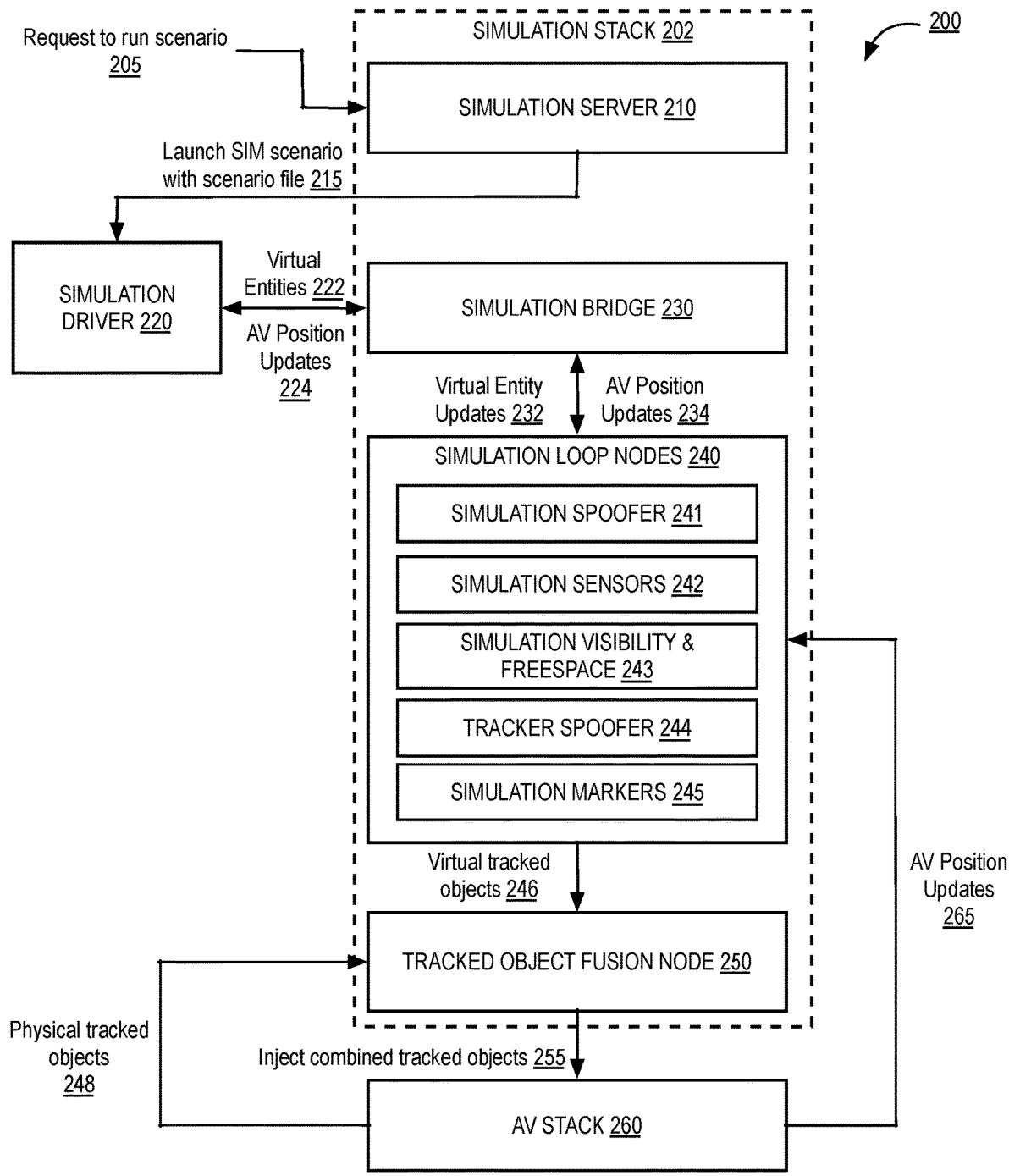
FIG. 2 illustrates a computing system of an AV that implements purposeful stress testing of AV response time with simulation, in accordance with embodiments herein.

FIG. 2 illustrates a computing system 200 of an AV that implements purposeful stress testing of AV response time with simulation, in accordance with embodiments herein. In one embodiment, computing system 200 may be the same as local computing device 110 of AV 100 described with respect to FIG. 1. In one embodiment, computing system 200 implements the modified combined AV stack 260 and simulation stack 202 to provide the purposeful stress testing of AV response time with simulation described herein.

In the computing system 200 of the AV, a simulation stack 202 is provided that includes, a simulation server 210, simulation bridge 230, simulation loop nodes 240, and tracked object fusion node 250. More or less components than described herein may be included as part of simulation stack 202 and the implementation of simulation stack 202 in the AV is not solely limited to the described components herein.

The simulation server 210 may be a server process, such as an HTTP server process, that waits and listens for requests to run simulation scenarios 205. The request to run the simulation scenario 205 may be received from a tool, such as a scene editor tool or a simple HTTP tool, for example. The request to run the simulation scenario may also include a scenario file that defines the simulation to be run. When the simulation server 210 receives a request 205, it launches 215 a simulation (SIM) scenario using the scenario file.

The scenario file can define a map (e.g., a map of the real-world test course), a virtual starting location (of the simulation AV) on the map, a list of virtual entities (e.g., virtual obstacles), positions and paths of the virtual entities, and/or simulation zones. A scenario file author may select/define the map, AV starting location, positions and paths for the virtual entities, and/or the simulation zones. The scenario file may also define a set of simulation zones and types of conditions or events that define control of when virtual entities should appear (and where they appear) in the simulation. The simulation zones may be an area defined by geographic boundaries. There are several types of events or conditions that can be defined to control when the virtual entities should appear, such as the AV entering the simulation zone, the AV reaching a certain velocity or acceleration, passing a particular object, etc.

The simulation driver 220 may be a simulator engine that manages the simulated world and spawns/updates/removes virtual entities. In one embodiment, the simulation driver 220 is the same as simulation driver 150 described with respect to FIG. 1. The simulation driver 220 utilizes the scenario file that places the simulation AV at a location on a real map, defines entity positions and spawn conditions, and defines simulation zones.

When the simulation driver 220 begins running the simulation, it provides identification of virtual entities 222 to the simulation bridge 230. The simulation bridge 230 provides a two-way communication "bridge" between the AV stack 260, the simulation driver 220, and the rest of the simulation stack 202. The simulation bridge 230 is responsible for informing the simulation driver 220 where the AV is physically located (AV position updates 224) at each "tick" (e.g., execution cycle of the computing system 200) and for passing the simulation driver's 220 virtual entity updates 232 to the rest of the simulation stack 202. The simulation bridge 230 can act as a translator that translates formats utilized by the AV stack 260 and the simulation stack 202 so that data passed between the two components can be understood. In some embodiments, if the simulation driver 220 is not running a simulation, the simulation bridge 230 can publish empty information to the rest of the simulation stack 202.

The simulation driver 220 may utilize the AV position updates 224 to run the simulation and cause a virtual position of the simulated AV to be continually "snapped" to (e.g., moved/updated to match or equal) the location of the real AV. The simulation driver 220 may further utilize the virtual entity definitions defined in the scenario file to determine which virtual entities 222 to provide to the simulation bridge 230. In one embodiment, the scenario file defines simulation zones and/or spawning conditions that are utilized by the simulation driver 220 to identify when and where virtual entities should appear in the simulation. As previously noted, the simulation zones may be areas defined by geographic borders. When the simulation driver 220 determines that the simulation AV enters one of the simulator zones, the simulation driver 220 may identify one or more virtual entities that should be created when an event or condition of the simulation AV occurs in that simulation zone. For example, there are several types of events or conditions that may define when the virtual entities should be created (spawned, injected, etc.), such as the AV entering the simulation zone, the AV reaching a certain velocity or acceleration, passing a particular object in the simulation zone, etc. When the simulation driver 220 determines that the set of conditions/events have occurred to cause a virtual entity to appear, the simulation driver 220 may provide that virtual entity (and its position) to the simulation bridge 230 as part of the list of virtual entities 222.

The simulation loop nodes 240 include a set of components utilized by the simulation stack 202 during the simulation to keep the virtual position of the simulated AV coordinated with the physical position of the real AV. The simulation loop nodes 240 include, but are not limited to, a simulation spoofer 241, simulation sensors 242, simulation visibility and freespace component 243, tracker spoofer 244, and simulation markers 245.

The simulation spoofer 241 reads AV position updates 265 from the AV stack 260 and converts the AV position updates 265 into a format that the simulation bridge 230 can consume as AV position updates 234. This enables the real AV and the simulation AV to be in the same location. Once the re-formatted AV position updates 234 are provided to the simulation bridge 230, the simulation bridge 230 can communicate those to the simulation driver as AV position updates 224.

Simulation sensors 242 also take in the AV position updates 265 from the AV stack and uses the relative position of the real AV to update the simulated sensor positions of the simulated AV as the real AV moves. The updated simulated sensor positions are then used by the simulation visibility and freespace component 243.

The simulation visibility and freespace component 243 determines the virtual entities that would be "visible" to the simulation AV's sensors. The term "visible" may refer to a determined standard for objects detected by AV sensors, such as within a determined threshold distance of the AV, location in reference to the AV (in front, behind, etc.), and so on. With reference to the AV stack 260, the simulation visibility and freespace component 243 may correlate to (perform similar functions as) the perception stack in the AV stack 260. The simulation visibility and freespace component 243 may generate a visible objects list for the simulation AV that defines the current "visible" virtual entities in the simulation.

The tracker spoofer 244 is a simulation counterpart to the AV tracker functionality. The tracker spoofer 244 can read the visible objects list from the simulation visibility and freespace component 243 and reformat the data into tracked object messages 246 that the AV stack 260 can utilize (e.g., a format that the AV stack is familiar with and can consume).

The simulation markers 245 is a simulation node that publishes indicators (markers) for virtual entities that aid in visibility and debugging. The markers enable test operators/engineers to see what is happening in the simulation during a test or afterwards when debugging.

The virtual tracked objects 246 from the tracker spoofer 244 are then utilized by the tracked object fusion node 250 to combine with physical tracked objects 248 from an AV tracker component of the AV stack 260 into a final tracked object list for the AV stack 260. In some embodiments, the tracked object fusion node 250 can also remove (subtract) objects from the physical tracked objects 248 so that the AV stack 260 does not see certain real objects. The final tracked object list is injected 255 into the AV stack 260 by the tracked object fusion node. The AV stack 260 then utilizes the final tracked object list as part of its AV operation process, causing the AV to react to the virtual entities as if the virtual entities existed in the real world on the real-world closed course.

As such, embodiments herein provide a technique to inject virtual entities (virtual obstacles) into a real-world test course for an AV. In operation, after the scenario file is ready, the closed course test can proceed. A test operator may follow the following example procedure:

1. Launch the AV with the modified AV stack and simulation stack.
2. Drive the AV to the same physical starting location as specified in the scenario file.
3. Launch the simulation scenario by using a tool (e.g., HTTP tool) that can communicate with the simulation server 210. This could be via a terminal command, or could be a feature directly in a Scene Edit tool or another tool.
4. Engage operation of the real AV.
5. AV drives to its destination (in the real world and simulation world), and reacts to any virtual entities configured in the simulation scenario. Results are recorded and analyzed.

FIG. 3 illustrates an example method 300 for implementing purposeful stress testing of AV response time with simulation, in accordance with embodiments herein. Although the example method 300 depicts a particular sequence of operations, the sequence may be altered without departing from the scope of the disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some embodiments, the method 300 includes block 310 where a request is received to launch a simulation scenario on an AV that is to operate on a real-world test course. In one embodiment, the request is received at a simulation server operating on the AV as part of a simulation stack. The request may include a scenario file that defines the simulation. At block 320, a simulation derived from the simulation scenario file is initiated on the AV using a simulation driver executing on the AV. In one embodiment, the simulation server causes the simulation driver to launch the simulation using the scenario file.

Then, at block 330, operation of the AV is engaged on the real-world test course. At block 340, during the operation of the AV, a simulated AV position in the simulation is coordinated with a physical position of the AV on the real-world test course. In one embodiment, AV position updates from the AV stack are used by the simulation stack to cause the virtual position of the simulation AV to be snapped to the physical position of the AV in the real world. Subsequently, at block 350, virtual entities from the simulation are combined with physical entities on the real-world test course into a list of tracked objects for the AV. In one embodiment, a track object fusion node causes the virtual and physical entities to be combined into a single tracked objects list. Lastly, at block 360, the AV is caused to respond to the list of tracked objects including the virtual entities and the physical entities during the operation of the AV on the real-world test course.

FIG. 4 illustrates an example method 400 for implementing purposeful stress testing of purposeful stress testing of autonomous vehicle response time with simulation using simulation zones, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where a simulation derived from a simulation scenario is initiated using a simulation driver executing on the AV. In one embodiment, a simulation server of a simulation stack executing on the AV causes the simulation driver to launch the simulation using the scenario file. Then, at block 420, operation of the AV is engaged on a real-world test course having physical entities. In one embodiment, the operation of the AV is engaged at a physical starting point that is the same as a virtual starting point defined in the simulation.

Subsequently, at block 430, during the operation of the AV, a simulated AV position in the simulation is coordinated with a physical position of the AV on the real-world test course. In one embodiment, AV position updates from the AV stack are used by the simulation stack to cause the virtual position of the simulation AV to be snapped to the physical position of the AV in the real world. Then, at block 440, responsive to the simulated AV position entering a simulation zone of the simulation, the occurrence of at least one defined event corresponding to the simulation zone is monitored for.

At block 450, responsive to occurrence of the at least one defined event in the simulation zone, a virtual entity is identified corresponding to the at least one defined event and the simulation zone. Lastly, at block 460, the virtual entity is caused to be injected into a list of tracked objects maintained by an AV stack executing on the AV. In one embodiment, the list of tracked objects comprises the physical entities and the virtual entities, and the AV is to physically respond to the list of tracked objects during the operation on the real-world test course.

Figure 5:
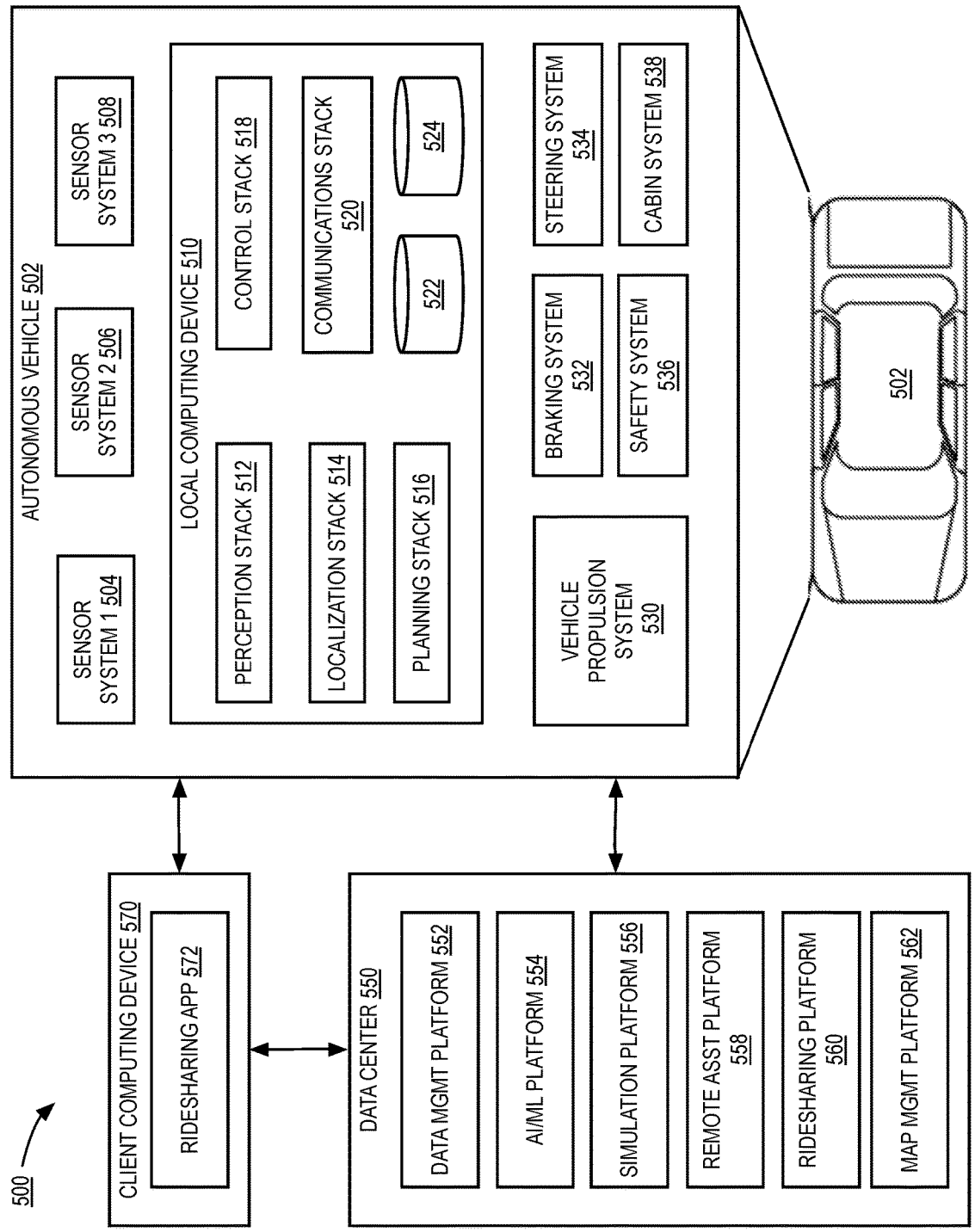
FIG. 5 illustrates an example system environment that can be used to facilitate AV dispatch and operations, according to some aspects of the disclosed technology.

Turning now to FIG. 5, this figure illustrates an example of an AV management system 500. In one embodiment, the AV management system 500 can implement purposeful stress testing of autonomous vehicle response time with simulation, as described further herein. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 502 can navigate about roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors.

AV 502 can also include several mechanical systems that can be used to maneuver or operate AV 502. For instance, the mechanical systems can include vehicle propulsion system 530, braking system 532, steering system 534, safety system 536, and cabin system 538, among other systems. Vehicle propulsion system 530 can include an electric motor, an internal combustion engine, or both. The braking system 532 can include an engine brake, a wheel braking system (e.g., a disc braking system that utilizes brake pads), hydraulics, actuators, and/or any other suitable componentry configured to assist in decelerating AV 502. The steering system 534 can include suitable componentry configured to control the direction of movement of the AV 502 during navigation. Safety system 536 can include lights and signal indicators, a parking brake, airbags, and so forth. The cabin system 538 can include cabin temperature control systems, in-cabin entertainment systems, and so forth. In some embodiments, the AV 502 may not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a planning stack 516, a control stack 518, a communications stack 520, a High Definition (HD) geospatial database 522, and an AV operational database 524, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception stack 512 can detect and classify objects and determine their current and predicted locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth.

Mapping and localization stack 514 can determine the AV's position and orientation (pose) using different methods from multiple systems (e.g., GPS, IMUs, cameras, LIDAR, RADAR, ultrasonic sensors, the HD geospatial database 522, etc.). For example, in some embodiments, the AV 502 can compare sensor data captured in real-time by the sensor systems 504-508 to data in the HD geospatial database 522 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The planning stack 516 can determine how to maneuver or operate the AV 502 safely and efficiently in its environment. For example, the planning stack 516 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 502 from one point to another. The planning stack 516 can determine multiple sets of one or more mechanical operations that the AV 502 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 516 can select from multiple backup plans to carry out. For example, while preparing to change lanes to turn right at an intersection, another vehicle may aggressively cut into the destination lane, making the lane change unsafe. The planning stack 516 could have already determined an alternative plan for such an event, and upon its occurrence, help to direct the AV 502 to go around the block instead of blocking a current lane while waiting for an opening to change lanes.

The control stack 518 can manage the operation of the vehicle propulsion system 530, the braking system 532, the steering system 534, the safety system 536, and the cabin system 538. The control stack 518 can receive sensor signals from the sensor systems 504-508 as well as communicate with other stacks or components of the local computing device 510 or a remote system (e.g., the data center 550) to effectuate operation of the AV 502. For example, the control stack 518 can implement the final path or actions from the multiple paths or actions provided by the planning stack 516. This can involve turning the routes and decisions from the planning stack 516 into commands for the actuators that control the AV's steering, throttle, brake, and drive unit.

The communication stack 520 can transmit and receive signals between the various stacks and other components of the AV 502 and between the AV 502, the data center 550, the client computing device 570, and other remote systems. The communication stack 520 can enable the local computing device 510 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 520 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 522 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 524 can store raw AV data generated by the sensor systems 504-508 and other components of the AV 502 and/or data received by the AV 502 from remote systems (e.g., the data center 550, the client computing device 570, etc.). In some embodiments, the raw AV data can include HD LIDAR point cloud data, image or video data, RADAR data, GPS data, and other sensor data that the data center 550 can use for creating or updating AV geospatial data as discussed further below with respect to FIG. 5 and elsewhere in the present disclosure.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes one or more of a data management platform 552, an Artificial Intelligence/Machine Learning (AI/ML) platform 554, a simulation platform 556, a remote assistance platform 558, a ridesharing platform 560, and a map management platform 562, among other systems.

Data management platform 552 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from the map management platform 562; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smart watch; smart eyeglasses or other Head-Mounted Display (HMD); smart car pods or other smart in-car, on-ear, or over-ear device; etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to be picked up or dropped off from the ridesharing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
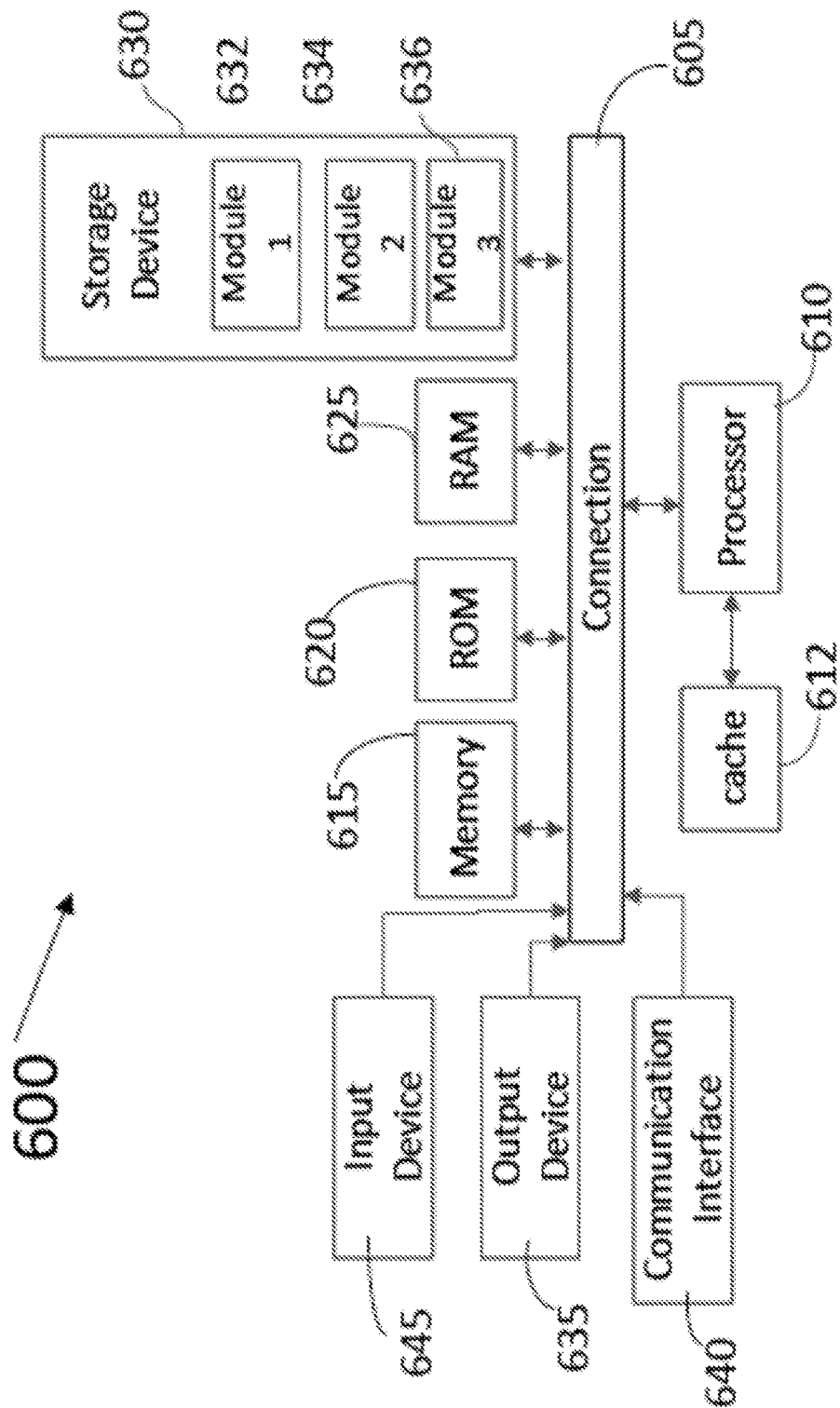
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM)

optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the hardware components, such as processor 610, connection 605, output device 635, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments.

Generally, program modules include routines, programs, components, data structures, objects, and the functions utilized in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a method for facilitating purposeful stress testing of autonomous vehicle response time with simulation, where the method comprises receiving, by a processing device, a request to launch a simulation scenario on an autonomous vehicle (AV) that is to operate on a real-world test course; initiating, by the processing device, a simulation derived from the simulation scenario using a simulation driver that is executing on the AV; engaging, by the processing device, operation of the AV on the real-world test course; coordinating, by the processing device during the operation of the AV, a simulated AV position in the simulation with a physical AV position of the AV on the real-world test course; combining, by the processing device, virtual entities from the simulation with physical entities on the real-world test course into a list of tracked objects for the AV; and causing, by the processing device, the AV to respond to the list of tracked objects including the virtual entities and the physical entities during the operation of the AV on the real-world test course.

In Example 2, the subject matter of Example 1 can optionally include wherein the request to launch the simulation scenario is received responsive to the AV being geographically positioned at a starting location on the real-world test course that is the same as a virtual starting location on a map of the simulation scenario. In Example 3, the subject matter of any one of Examples 1-2 can optionally include wherein combining the virtual entities with the physical entities comprises injecting the virtual entities into the list of tracked objects maintained by an AV stack of the AV. In Example 4, the subject matter of any one of Examples 1-3 can optionally include wherein injecting the virtual entities is performed responsive to the simulated AV position in the simulation entering a simulation zone defined in the simulation scenario, and wherein the simulation zone corresponds to one or more of the virtual entities that are triggered for injection to the list of tracked objects responsive to occurrence of an event of the AV.

In Example 5, the subject matter of any one of Examples 1-4 can optionally include wherein the AV stack is separate from a simulation stack that is executing on the AV, the simulation stack comprising a simulation server to receive the request to launch the simulation scenario and cause the simulation driver to initiate and execute the simulation on the AV. In Example 6, the subject matter of any one of Examples 1-5 can optionally include wherein simulation stack further comprises a simulation bridge to communicate between the AV stack, the simulation driver, and the simulation stack, and wherein the simulation bridge is to communicate updates on the physical AV position to the simulation driver.

In Example 7, the subject matter of any one of Examples 1-6 can optionally include wherein simulation stack further comprises simulation loop nodes comprising: a simulation spoofer to translate a first format of the physical AV position to a second format of the simulated AV position used by the simulation bridge; simulation sensors to update positions of simulation sensors of a simulated AV in the simulation based on the physical AV position; simulation visibility and freespace component to determine the virtual entities from a list of virtual entities of the simulation scenario that are visible to the simulation sensors; and a tracker spoofer to convert the virtual entities determined to be visible to the simulation sensors into a tracked object format that can be consumed by the AV stack.

In Example 8, the subject matter of any one of Examples 1-7 can optionally include wherein simulation stack further comprises a tracked object fusion node to combine the virtual entities in the tracked object format with physical entities on the real-world test course into the list of tracked objects for the AV. In Example 9, the subject matter of any one of Examples 1-8 can optionally include wherein the simulation scenario comprises a scenario file defining a map of the real-world test course, a virtual starting location on the map, a list of virtual entities, and positions of the virtual entities.

Example 10 includes an apparatus for facilitating purposeful stress testing of autonomous vehicle response time with simulation, the apparatus of Example 10 comprising one or more hardware processors to: receive a request to launch a simulation scenario on an autonomous vehicle (AV) that is to operate on a real-world test course; initiate a simulation derived from the simulation scenario using a simulation driver that is executing on the AV; engage operation of the AV on the real-world test course; coordinate, during the operation of the AV, a simulated AV position in the simulation with a physical AV position of the AV on the real-world test course; combine virtual entities from the simulation with physical entities on the real-world test course into a list of tracked objects for the AV; and cause the AV to respond to the list of tracked objects including the virtual entities and the physical entities during the operation of the AV on the real-world test course.

In Example 11, the subject matter of Example 10 can optionally include wherein the request to launch the simulation scenario is received responsive to the AV being geographically positioned at a starting location on the real-world test course that is the same as a virtual starting location on a map of the simulation scenario. In Example 12, the subject matter of Examples 10-11 can optionally include wherein combining the virtual entities with the physical entities comprises injecting the virtual entities into the list of tracked objects maintained by an AV stack of the AV, wherein injecting the virtual entities is performed responsive to the simulated AV position in the simulation entering a simulation zone defined in the simulation scenario, and wherein the simulation zone corresponds to one or more of the virtual entities that are triggered for injection to the list of tracked objects responsive to occurrence of an event of the AV.

In Example 13, the subject matter of Examples 10-12 can optionally include wherein the AV stack is separate from a simulation stack that is executing on the AV, the simulation stack comprising a simulation server to receive the request to launch the simulation scenario and cause the simulation driver to initiate and execute the simulation on the AV, and wherein simulation stack further comprises a simulation bridge to communicate between the AV stack, the simulation driver, and the simulation stack, and wherein the simulation bridge is to communicate updates on the physical AV position to the simulation driver.

In Example 14, the subject matter of Examples 10-13 can optionally include wherein simulation stack further comprises simulation loop nodes comprising: a simulation spoofer to translate a first format of the physical AV position to a second format of the simulated AV position used by the simulation bridge; simulation sensors to update positions of simulation sensors of a simulated AV in the simulation based on the physical AV position; simulation visibility and freespace component to determine the virtual entities from a list of virtual entities of the simulation scenario that are visible to the simulation sensors; and a tracker spoofer to convert the virtual entities determined to be visible to the simulation sensors into a tracked object format that can be consumed by the AV stack.

In Example 15, the subject matter of Examples 10-14 can optionally include wherein simulation stack further comprises a tracked object fusion node to combine the virtual entities in the tracked object format with physical entities on the real-world test course into the list of tracked objects for the AV.

Example 16 is a non-transitory computer-readable storage medium for facilitating purposeful stress testing of autonomous vehicle response time with simulation. The non-transitory computer-readable storage medium of Example 16 having stored thereon executable computer program instructions that, when executed by one or more processors, cause the one or more processors to: receive a request to launch a simulation scenario on an autonomous vehicle (AV) that is to operate on a real-world test course; initiate a simulation derived from the simulation scenario using a simulation driver that is executing on the AV; engage operation of the AV on the real-world test course; coordinate, during the operation of the AV, a simulated AV position in the simulation with a physical AV position of the AV on the real-world test course; combine virtual entities from the simulation with physical entities on the real-world test course into a list of tracked objects for the AV; and cause the AV to respond to the list of tracked objects including the virtual entities and the physical entities during the operation of the AV on the real-world test course.

In Example 17, the subject matter of Example 16 can optionally include wherein combining the virtual entities with the physical entities comprises injecting the virtual entities into the list of tracked objects maintained by an AV stack of the AV, wherein injecting the virtual entities is performed responsive to the simulated AV position in the simulation entering a simulation zone defined in the simulation scenario, and wherein the simulation zone corresponds to one or more of the virtual entities that are triggered for injection to the list of tracked objects responsive to occurrence of an event of the AV. In Example 18, the subject matter of Examples 16-17 can optionally include wherein the AV stack is separate from a simulation stack that is executing on the AV, the simulation stack comprising a simulation server to receive the request to launch the simulation scenario and cause the simulation driver to initiate and execute the simulation on the AV, and wherein simulation stack further comprises a simulation bridge to communicate between the AV stack, the simulation driver, and the simulation stack, and wherein the simulation bridge is to communicate updates on the physical AV position to the simulation driver.

In Example 19, the subject matter of Examples 16-18 can optionally include wherein simulation stack further comprises simulation loop nodes comprising: a simulation spoofer to translate a first format of the physical AV position to a second format of the simulated AV position used by the simulation bridge; simulation sensors to update positions of simulation sensors of a simulated AV in the simulation based on the physical AV position; simulation visibility and freespace component to determine the virtual entities from a list of virtual entities of the simulation scenario that are visible to the simulation sensors; and a tracker spoofer to convert the virtual entities determined to be visible to the simulation sensors into a tracked object format that can be consumed by the AV stack. In Example 20, the subject matter of Examples 16-19 can optionally include wherein simulation stack further comprises a tracked object fusion node to combine the virtual entities in the tracked object format with physical entities on the real-world test course into the list of tracked objects for the AV.

Example 21 is a system for facilitating purposeful stress testing of autonomous vehicle response time with simulation. The system of Example 21 can optionally include a memory to store a block of data, and one or more hardware processors to receive a request to launch a simulation scenario on an autonomous vehicle (AV) that is to operate on a real-world test course; initiate a simulation derived from the simulation scenario using a simulation driver that is executing on the AV; engage operation of the AV on the real-world test course; coordinate, during the operation of the AV, a simulated AV position in the simulation with a physical AV position of the AV on the real-world test course; combine virtual entities from the simulation with physical entities on the real-world test course into a list of tracked objects for the AV; and cause the AV to respond to the list of tracked objects including the virtual entities and the physical entities during the operation of the AV on the real-world test course.

In Example 22, the subject matter of Example 21 can optionally include wherein the request to launch the simulation scenario is received responsive to the AV being geographically positioned at a starting location on the real-world test course that is the same as a virtual starting location on a map of the simulation scenario. In Example 23, the subject matter of Examples 21-22 can optionally include wherein combining the virtual entities with the physical entities comprises injecting the virtual entities into the list of tracked objects maintained by an AV stack of the AV, wherein injecting the virtual entities is performed responsive to the simulated AV position in the simulation entering a simulation zone defined in the simulation scenario, and wherein the simulation zone corresponds to one or more of the virtual entities that are triggered for injection to the list of tracked objects responsive to occurrence of an event of the AV.

In Example 24, the subject matter of Examples 21-23 can optionally include wherein the AV stack is separate from a simulation stack that is executing on the AV, the simulation stack comprising a simulation server to receive the request to launch the simulation scenario and cause the simulation driver to initiate and execute the simulation on the AV, and wherein simulation stack further comprises a simulation bridge to communicate between the AV stack, the simulation driver, and the simulation stack, and wherein the simulation bridge is to communicate updates on the physical AV position to the simulation driver.

In Example 25, the subject matter of Examples 21-24 can optionally include wherein simulation stack further comprises simulation loop nodes comprising: a simulation spoofer to translate a first format of the physical AV position to a second format of the simulated AV position used by the simulation bridge; simulation sensors to update positions of simulation sensors of a simulated AV in the simulation based on the physical AV position; simulation visibility and freespace component to determine the virtual entities from a list of virtual entities of the simulation scenario that are visible to the simulation sensors; and a tracker spoofer to convert the virtual entities determined to be visible to the simulation sensors into a tracked object format that can be consumed by the AV stack.

In Example 26, the subject matter of Examples 21-25 can optionally include wherein simulation stack further comprises a tracked object fusion node to combine the virtual entities in the tracked object format with physical entities on the real-world test course into the list of tracked objects for the AV.

Example 27 includes an apparatus comprising means for performing the method of any of the Examples 1-9. Example 28 is at least one machine readable medium comprising a plurality of instructions that in response to being executed on a computing device, cause the computing device to carry out a method according to any one of Examples 1-9. Example 29 is an apparatus for facilitating purposeful stress testing of autonomous vehicle response time with simulation, configured to perform the method of any one of Examples 1-9. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
receiving, by a processing device, a request to launch a simulation scenario on an autonomous vehicle (AV) that is to operate on a real-world test course, the AV having an AV stack, and a separate simulation driver and simulation stack each executing on the AV. the simulation stack comprising a simulation server configured to receive the request to launch the simulation scenario, a simulation bridge configured communicate between the AV stack, the simulation driver, and the simulation stack;

initiating, by the processing device, a simulation derived from the simulation scenario using the simulation driver that is executing on the AV, the simulation server causing the simulation driver to initiate and execute the simulation on the AV;

engaging, by the processing device, operation of the AV on the real-world test course;

coordinating, by the processing device during the operation of the AV, a simulated AV position of an AV in the simulation with a physical AV position of the AV on the real-world test course via the simulation bridge communicating updates on the physical AV position to the simulation driver and simulation loop nodes of the simulation stack comprising a simulation spoofer configured to translate a first format of the physical AV position to a second format of the simulated AV position used by the simulation bridge, simulation sensors configured to update simulated sensor positions of the simulated AV in the simulation based on the physical AV position, a simulation visibility and freespace component configured to determine virtual entities from a list of virtual entities of the simulation scenario that are visible to the simulation sensors, and a tracker spoofer configured to convert the virtual entities determined to be visible to the simulation sensors into a tracked object format that can be consumed by the AV stack;

combining, by the processing device, virtual entities from the simulation with physical entities on the real-world test course into a list of tracked objects for the AV by injecting the virtual entities into the list of tracked objects maintained by the AV stack in response to the simulated AV position entering a simulation zone defined in the simulation scenario, wherein the simulation zone corresponds to one or more of the virtual entities that are triggered for injection to the list of tracked objects responsive to the occurrence of an event of the AV; and causing, by the processing device, the AV to respond to the list of tracked objects including the virtual entities and the physical entities during the operation of the AV on the real-world test course.

2. The method of claim 1, wherein the request to launch the simulation scenario is received responsive to the AV being geographically positioned at a starting location on the real-world test course that is the same as a virtual starting location on a map of the simulation scenario.

3. The method of claim 1, wherein simulation stack further comprises a tracked object fusion node to combine the virtual entities in the tracked object format with physical entities on the real-world test course into the list of tracked objects for the AV.

4. The method of claim 1, wherein the simulation scenario comprises a scenario file defining a map of the real-world test course, a virtual starting location on the map, a list of virtual entities, and positions of the virtual entities.

5. An apparatus comprising:
one or more hardware processors on an autonomous vehicle (AV) executing an AV stack to operate the AV and executing a separate simulation driver and simulation stack, the simulation stack comprising a simulation server and a simulation bridge configured to communicate between the AV stack, the simulation driver, and the simulation stack, the one or more hardware processors configured to:

receive, via the simulation server, a request to launch a simulation scenario on the AV that is to operate on a real-world test course;

initiate a simulation derived from the simulation scenario via the simulation server causing the simulation driver to initiate and execute the simulation on the AV in response to the request to launch a simulation scenario on the AV;

engage operation of the AV on the real-world test course;

coordinate, during the operation of the AV, a simulated AV position in the simulation with a physical AV position of the AV on the real-world test course via the simulation bridge communicating updates on the physical AV position to the simulation driver and simulation loop nodes of the simulation stack comprising a simulation spoofer configured to translate a first format of the physical AV position to a second format of the simulated AV position used by the simulation bridge, simulation sensors configured to update simulated sensor positions of the simulated AV in the simulation based on the physical AV position, a simulation visibility and freespace component configured to determine virtual entities from a list of virtual entities of the simulation scenario that are visible to the simulation sensors, and a tracker spoofer to convert the virtual entities determined to be visible to the simulation sensors into a tracked object format that can be consumed by the AV stack;

combine virtual entities from the simulation with physical entities on the real-world test course into a list of tracked objects for the AV by injecting the virtual entities into the list of tracked objects maintained by the AV stack, wherein injecting the virtual entities is performed responsive to the simulated AV position in the simulation entering a simulation zone defined in the simulation scenario, and wherein the simulation zone corresponds to one or more of the virtual entities that are triggered for injection to the list of tracked objects responsive to occurrence of an event of the AV; and cause the AV to respond to the list of tracked objects including the virtual entities and the physical entities during the operation of the AV on the real-world test course.

6. The apparatus of claim 5, wherein the request to launch the simulation scenario is received responsive to the AV being geographically positioned at a starting location on the real-world test course that is the same as a virtual starting location on a map of the simulation scenario.

7. The apparatus of claim 5, wherein simulation stack further comprises a tracked object fusion node to combine the virtual entities in the tracked object format with physical entities on the real-world test course into the list of tracked objects for the AV.

8. A non-transitory computer-readable medium having stored thereon instructions that, when executed by one or more processors on an autonomous vehicle (AV), cause the one or more processors to:

execute an AV stack configured to operate the AV and execute a separate simulation driver and simulation stack, the simulation stack comprising a simulation server and a simulation bridge configured to communicate between the AV stack, the simulation driver, and the simulation stack receive, via the simulation server, a request to launch a simulation scenario on the AV that is to operate on a real-world test course;

initiate a simulation derived from the simulation scenario via the simulation server causing the simulation driver to initiate and execute the simulation on the AV in response to the request to launch a simulation scenario on the AV;

engage operation of the AV on the real-world test course;

coordinate, during the operation of the AV, a simulated AV position in the simulation with a physical AV position of the AV on the real-world test course via the simulation bridge communicating updates on the physical AV position to the simulation driver and simulation loop nodes of the simulation stack comprising a simulation spoofer configured to translate a first format of the physical AV position to a second format of the simulated AV position used by the simulation bridge, simulation sensors configured to update simulated sensor positions of the simulated AV in the simulation based on the physical AV position, a simulation visibility and freespace component configured to determine virtual entities from a list of virtual entities of the simulation scenario that are visible to the simulation sensors, and a tracker spoofer to convert the virtual entities determined to be visible to the simulation sensors into a tracked object format that can be consumed by the AV stack;

combine virtual entities from the simulation with physical entities on the real-world test course into a list of tracked objects for the AV by injecting the virtual entities into the list of tracked objects maintained by the AV stack, wherein injecting the virtual entities is performed responsive to the simulated AV position in the simulation entering a simulation zone defined in the simulation scenario, and wherein the simulation zone corresponds to one or more of the virtual entities that are triggered for injection to the list of tracked objects responsive to occurrence of an event of the AV; and cause the AV to respond to the list of tracked objects including the virtual entities and the physical entities during the operation of the AV on the real-world test course.

9. The non-transitory computer-readable medium of claim 8, wherein simulation stack further comprises a tracked object fusion node to combine the virtual entities in the tracked object format with physical entities on the real-world test course into the list of tracked objects for the AV.

* * * * *